United States Patent
Jaubert et al.

(10) Patent No.: US 8,458,532 B2
(45) Date of Patent: Jun. 4, 2013

(54) ERROR HANDLING MECHANISM FOR A TAG MEMORY WITHIN COHERENCY CONTROL CIRCUITRY

(75) Inventors: Jocelyn Francois Orion Jaubert, Antibes (FR); Florent Begon, Antibes (FR); Melanie Emanuelle Lucie Teyssier, Grasse (FR)

(73) Assignee: ARM Limited, Cambridge (GB)

( * ) Notice: Subject to any disclaimer, the term of this patent is extended or adjusted under 35 U.S.C. 154(b) by 300 days.

(21) Appl. No.: 12/926,142

(22) Filed: Oct. 27, 2010

(65) Prior Publication Data

US 2012/0110396 A1    May 3, 2012

(51) Int. Cl.
*G06F 11/00* (2006.01)
(52) U.S. Cl.
USPC .................. 714/54; 714/10; 714/53; 712/14
(58) Field of Classification Search
USPC .................. 714/54, 10, 53; 712/14; 711/141
See application file for complete search history.

(56) References Cited

U.S. PATENT DOCUMENTS

| | | | | |
|---|---|---|---|---|
| 2003/0093726 A1* | 5/2003 | Tremblay et al. | | 714/52 |
| 2004/0139374 A1* | 7/2004 | Meaney et al. | | 714/48 |
| 2005/0188249 A1* | 8/2005 | Hart et al. | | 714/5 |
| 2008/0163008 A1* | 7/2008 | Jacob | | 714/699 |
| 2008/0244192 A1* | 10/2008 | Uchiyama | | 711/144 |
| 2008/0301531 A1* | 12/2008 | Bell et al. | | 714/768 |
| 2010/0146335 A1* | 6/2010 | Moyer et al. | | 714/25 |
| 2010/0185904 A1* | 7/2010 | Chen | | 714/54 |
| 2011/0060880 A1* | 3/2011 | Hosoda | | 711/124 |
| 2011/0289275 A1* | 11/2011 | Campbell | | 711/118 |

* cited by examiner

*Primary Examiner* — Chae Ko
(74) *Attorney, Agent, or Firm* — Nixon & Vanderhye P.C.

(57) ABSTRACT

A data processing system 2 is provided with multiple processor cores 4, 6, 8, 10 each incorporating a data cache memory 12, 14, 16, 18. A snoop control unit 20 manages coherency between the data values stored within the data caches 12, 14, 16, 18. The snoop control unit 20 incorporates a TAG memory 22. If an error is detected within an entry of the TAG memory 22, then a hit operation is forced to the corresponding storage location one or more of the data caches 12, 14, 16, 18.

16 Claims, 3 Drawing Sheets

ERROR HANDLING MECHANISM FOR A TAG MEMORY WITHIN COHERENCY CONTROL CIRCUITRY

BACKGROUND OF THE INVENTION

1. Field of the Invention

This invention relates to the field of data processing systems. More particularly, this invention relates to data processing systems including a plurality of processing circuits storing data values and having coherency control circuitry for controlling coherency of the data values stored within the plurality of control circuits.

2. Description of the Prior Art

It is known to provide data processing systems, such as the symmetric multiprocessing (SMP) systems designed by ARM Limited of Cambridge, England, which incorporate multiple processing circuits each storing data values (e.g. each having its own data cache) and coupled to coherency control circuitry for controlling the coherency of the data values stored within the different processing circuits. Such systems are useful in high performance computing environments and the coherency control circuitry permits data values to be shared between the different processing circuits without data coherence difficulties.

Within such systems the coherency control circuitry includes a TAG memory storing address values indicative of memory addresses associated with the data values stored within the different processing circuits. In this way, the coherency control circuitry is able to track which processing circuit is storing a copy of which data values. Accordingly, if one of the processing circuits modifies a data value stored locally and another processing circuit later wishes to access that data value, then it is possible for the modified data value to be forwarded to the requesting processing circuit such that it receives the most up-to-date value.

It can be important within data processing systems to provide a high degree of resilience to errors, such as hardware errors and soft errors (e.g. as produced by ionising radiation and the like). Such errors can corrupt the data values being stored and cause erroneous operation. If the data processing system is being used in a safety critical environment, such as a vehicle braking system, then it should include mechanisms to address such errors. One point of vulnerability in the high performance data processing systems described above is corruption of the data values stored within the TAG memory of the coherency control circuitry. This vulnerability may be addressed by associating error detection and correction codes with the address value stored within the TAG memory and providing error detecting and correcting circuitry to perform error detection and correction operations using those error detecting and correcting codes. However, a problem with this approach is that the requirement to store error correcting codes and the circuitry necessary to use those error correcting codes to correct address values represents a disadvantageous overhead both in terms of gate count and power consumption.

SUMMARY OF THE INVENTION

Viewed from one aspect the present invention provides an apparatus for processing data comprising:

a plurality processing circuits each including a cache memory configured to store data values from a main memory; and coherency control circuitry coupled to said plurality of processing circuits and configured to control coherency of data values stored within said plurality of processing circuits; wherein said coherency control circuitry includes:

(i) a TAG memory storing address values indicative of memory addresses within said main memory of data values stored within said plurality of processing circuits; and (ii) error detection circuitry coupled to said TAG memory, said error detection circuitry configured to detect an error within an entry of said TAG memory corresponding to a storage location within a cache memory of a processing circuit of said plurality of processing circuits and upon detection of said error to force a hit operation within said storage location.

The present invention recognises that within a TAG memory in which an entry is associated with a corresponding storage location of a cache memory of a processing circuit, should an error be detected within the entry within the TAG memory, is possible to take action which will prevent erroneous operation without having to correct the entry within the TAG memory. This technique recognises that should an error be detected within a TAG entry, it is possible to assume that a TAG match and force a hit operation to access the storage location within the cache memory which is associated with the TAG entry in error (e.g. associated by virtue of the index position within the cache including any set associativity). When such a hit operation is forced, then a comparison operation may take place within the cache memory itself to determine whether or not the storage location within the cache memory does in fact contain the data value associated with the memory address of a memory access request being considered.

The corrective action taken may be to mark the storage location within the cache memory as invalid. This will flush the data value out of the cache memory and force it to be reloaded from a main memory. This will ensure that erroneous operation is avoided, even if processing is temporarily slowed.

The error detection circuitry may be triggered to perform its detection operation by an access request to a target memory address received from one of the plurality of processing circuits. Such a memory access request will trigger a comparison between a target memory address of the memory access request with address data stored within a cache memory which is indicated by the TAG memory within the coherency control circuitry as storing that data value. A TAG memory entry which has an error in it may be assumed to indicate that the corresponding storage location within the cache memory is storing the data value concerned and the hit operation is forced with the comparison operation taking place at the cache level within the processing circuit itself providing a backup to ensure that the match is actually a correct match.

If the comparison performed within the cache memory indicates a match, then the access request is serviced by the storage location within the cache memory even if the corresponding entry in the TAG memory is in error. This preserves performance even if a TAG memory entry error has occurred.

If the data stored within the storage location is marked as dirty indicating that the data has been written within the storage location after being copied to the storage location from within the main memory, then the cache memory will perform a clean operation whereby the data is copied back to the main memory using address data stored within the cache memory (i.e. correct address data as contrasted with that stored in the TAG memory entry).

Subsequent reloading of the data value from the main memory will thus be correct as the most up-to-date data value will be reloaded from the main memory.

In some embodiments, an access request will trigger the reading of a plurality of entries within the TAG memory as multiple processing circuits may be holding copies of the data value concerned within their local cache. Hit operations may be forced in respect of each of these processing circuits with associated invalidation (and for at least one of the data values a clean operation if required).

The detection of an error within the TAG memory entries may be performed in respect of each of the plurality of entries within the TAG memory which may correspond to the access request being performed.

While the processing circuits could take a variety of different forms, the present technique is more suited to embodiments in which the processing circuits comprise a plurality of processor cores each executing a respective stream of program instructions and having an associated data cache memory.

Within this context the coherency control circuitry may be a snoop control unit for controlling coherency between the data cache memories associated with the respective processor cores.

Management of entries within the TAG memory which are in error may be facilitated by the provision within the coherency control circuitry of an error bank storing data identifying in which entries of the TAG memory an error has been detected.

The error bank may be used to control subsequent access requests to a storage location for which the TAG memory entry has already been detected to contain an error to force a hit operation to be performed, and if the data value stored within the storage location is dirty and accordingly is the most up-to-date version of the data value, until it is flushed back to the main memory. Once the data value has been flushed back to the main memory, then the error bank may indicate that the storage location corresponding to the error within the TAG memory is clean and accordingly subsequent access requests to the storage location can result in a miss such that the data will be reloaded from the main memory.

TAG entries marked within the error bank as having been subject to an error may be taken out of use until a subsequent test operation, such as a software test operation, confirms whether or not the TAG memory entry is suffering from a permanent hardware error or was the subject of a temporary soft error, such as resulting from a particle strike or a temporary perturbation.

Viewed from another aspect the present invention provides an apparatus for processing data comprising:

a plurality processing means for processing each including a cache means for storing data values from main memory means for storing data values; and coherency control means, coupled to said plurality of processing means, for controlling coherency of data values stored within said plurality of processing means; wherein said coherency control means includes:

(i) TAG memory means for storing address values indicative of memory addresses within said main memory means of data values stored within said plurality of processing means; and (ii) error detection means, coupled to said TAG memory means, for detecting an error within an entry of said TAG memory means corresponding to a storage location within a cache memory means of a processing means of said plurality of processing means and upon detection of said error to force a hit operation within said storage location.

Viewed from a further aspect the present invention provides a method of responding to errors within an apparatus for processing data comprising:

a plurality processing circuits each including a cache memory configured to store data values from a main memory; and coherency control circuitry coupled to said plurality of circuits and configured to control coherency of data values stored within said plurality of processing circuits; wherein said coherency control circuitry includes:

(i) a TAG memory storing address values indicative of memory addresses within said main memory of data values stored within said plurality of processing circuits; and (ii) error detection circuitry coupled to said TAG memory; said method comprising the steps of:

detecting an error within an entry of said TAG memory corresponding to a storage location within a cache memory of a processing circuit of said plurality of processing circuits; and upon detection of said error, forcing a hit operation within said storage location.

The above, and other objects, features and advantages of this invention will be apparent from the following detailed description of illustrative embodiments which is to be read in connection with the accompanying drawings.

DESCRIPTION OF THE EMBODIMENTS

Figure 1:
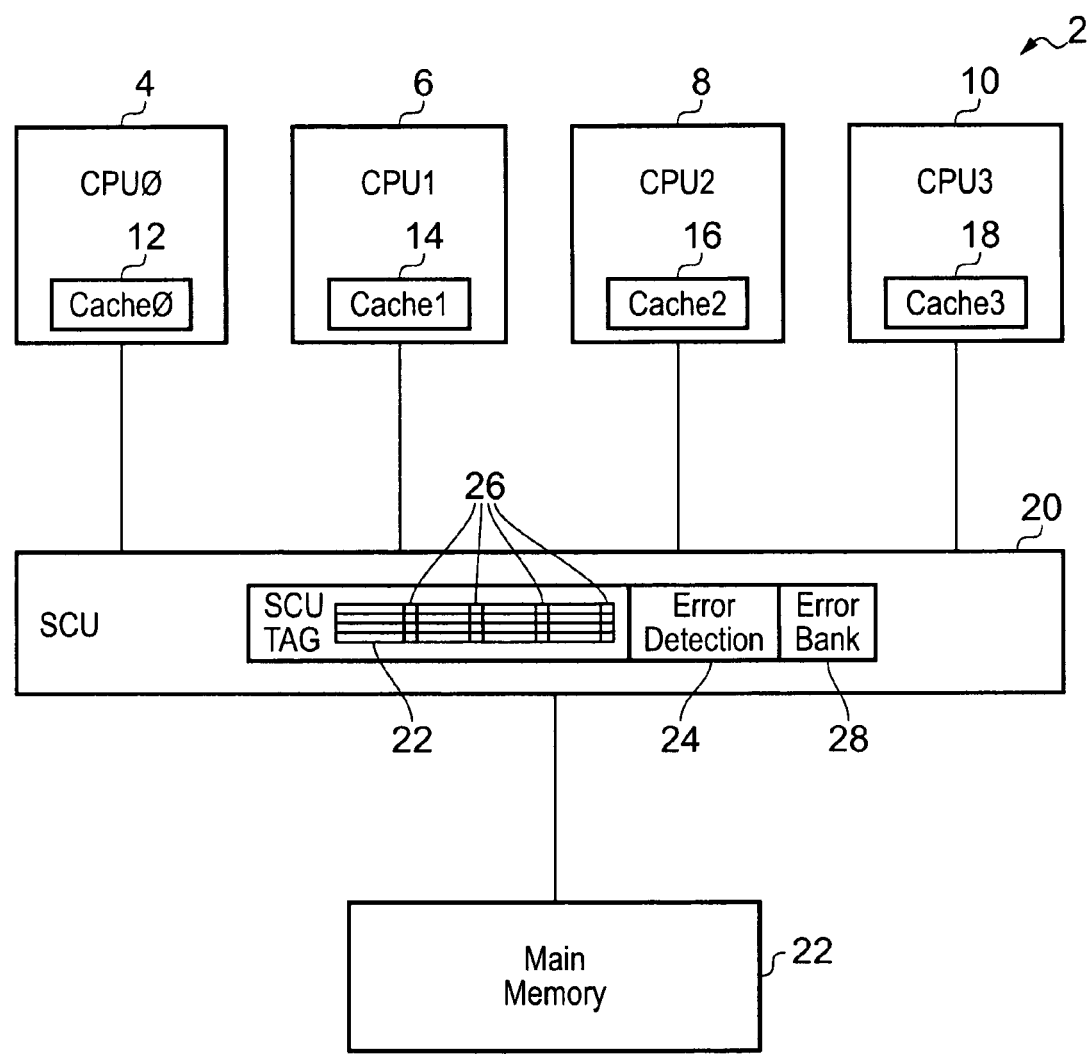
FIG. 1 schematically illustrates a symmetric multiprocessing system including a plurality of processing cores, coupled via a snoop control unit to a main memory.

FIG. 1 schematically illustrates a data processing system 2 incorporating a plurality of processing circuits in the form of processor cores 4, 6, 8, 10. These processor cores 4, 6, 8, 10 each execute a respective stream of program instructions and incorporate their own data cache 12, 14, 16, 18. A snoop control unit 20 serves as coherency control circuitry for controlling coherency between data values stored within the different data caches 12, 14, 16, 18. A main memory 22 coupled to the snoop control unit 20 also stores the data values which may be cached within the data caches 12, 14, 16, 18. This type of symmetric multiprocessing data processing system 2 will be familiar to those in this technical field.

The snoop control unit 20 includes a TAG memory 22 storing data indicating the memory addresses associated with the data values stored within respective storage locations of the data caches 12, 14, 16, 18. In this way the snoop control unit 20 is able to track which data cache 12, 14, 16, 18 is storing which data copied from the main memory 22. The snoop control unit will also track which of these data values is dirty, which is required for exclusive use and the like in accordance with normal symmetric multiprocessing techniques.

It will be appreciated that the integrity of the entries within the TAG memory 22 is important for the correct operation of the system. Accordingly, error detection circuitry 24 is coupled to the TAG memory 20 and uses error detection data 26 associated with each of the entries within the TAG memory to detect if an error occurs within those entries. As an example, the error detection data may be a simple parity bit. However, more robust error detection codes may be required and a balance struck between the storage space required for the error detection codes and the resilience to corruption. When an entry within the TAG memory is read, the address value stored within the TAG memory entry concerned can be compared with its associated error detecting data and the error detection circuitry 24 indicate whether the TAG memory entry is correct or incorrect.

If the TAG memory entry is incorrect, then a hit operation will be forced for that TAG memory entry comparison operation and the corresponding storage location within the associated data cache 12, 14, 16, 18 will be accessed. In one embodiment there may be a one-to-one correspondence between the TAG memory entries and storage locations within the data caches 12, 14, 16, 18. More complex relationships are also possible and it may be necessary to force multiple hit operations.

An error bank 28 serves to record which TAG memory entries have been subject to an error and the status of that error. If a TAG memory entry has been subject to an error and it has not been confirmed that any clean operation required for the data value within the storage location of the cache 12, 14, 16, 18 has already been performed, then a further memory access request to the same TAG memory entry will also force a hit operation. If any necessary clean operation is confirmed as having been performed, then a subsequent access to the TAG memory entry concerned will be forced to return a miss.

Figure 2:
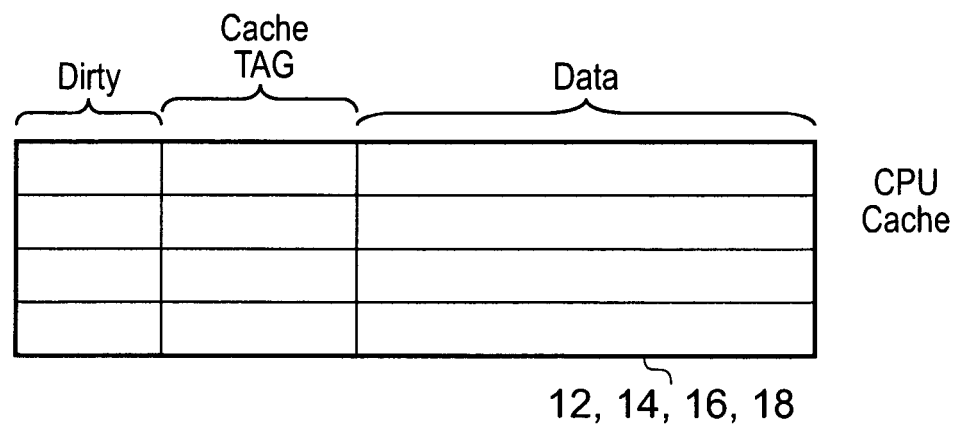
FIG. 2 schematically illustrates a data cache within a processor core.

FIG. 2 schematically illustrates one of the data caches 12, 14, 16, 18. The data cache in this simple example contains four cache lines. Each cache line incorporates the payload data, a cache TAG value indicating the memory address within the memory address space of the main memory 22 of the payload data. Dirty data associated with each cache line indicates whether or not a write operation has taken place to the payload data stored within the data cache memory 12, 14, 16, 18 whilst that payload data has been stored within the data cache 12, 14, 16, 18. If a cache line is marked as dirty, then it must be written back to the main memory 22 to ensure data consistency when it is flushed from the data cache. It will be noted that the TAG value stored within the data cache 12, 14, 16, 18 is effectively a duplicate of the TAG memory entry within the snoop control unit 20. This redundancy permits the need for error correction within a TAG memory entry of the snoop control unit 22 to be avoided even if an error is detected.

Figure 3:
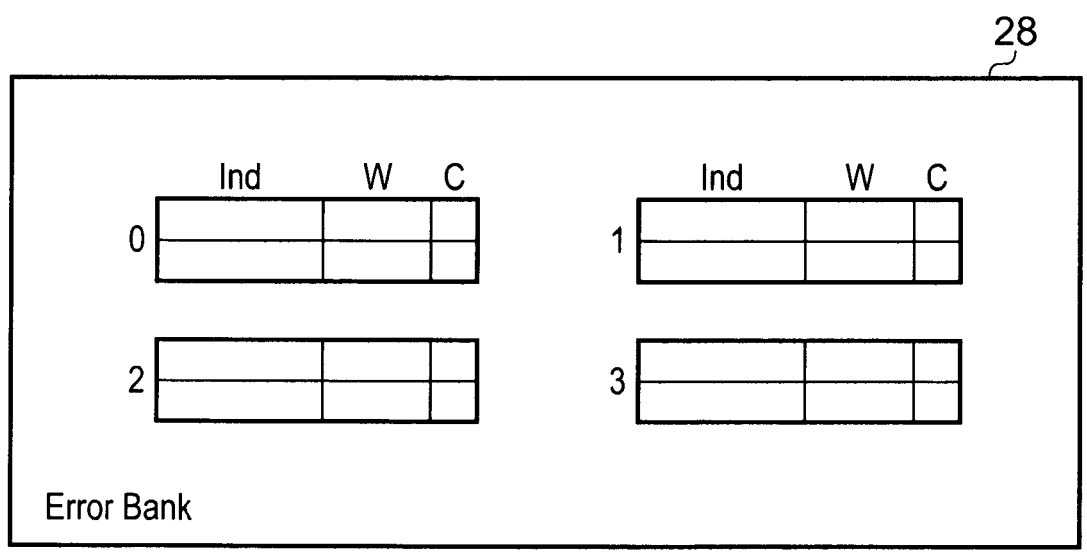
FIG. 3 schematically illustrates an error bank maintained within the snoop control unit.

FIG. 3 illustrates the error bank 28. For each data cache 12, 14, 16, 18 two entries are provided which permit up to two errors to be tolerated within each data cache 12, 14, 16, 18. Each of these entries stores data identifying the index, way and whether or not the corresponding storage location has been confirmed as clean. This enables detected errors to be managed once they have been detected and use of the TAG memory entries to be voided until they can be confirmed as suitable for a return to service. A software test operation may be performed to read and write TAG values within the snoop control unit 20 to confirm whether or not a hardware error is present or a soft error occurred.

Figure 4:
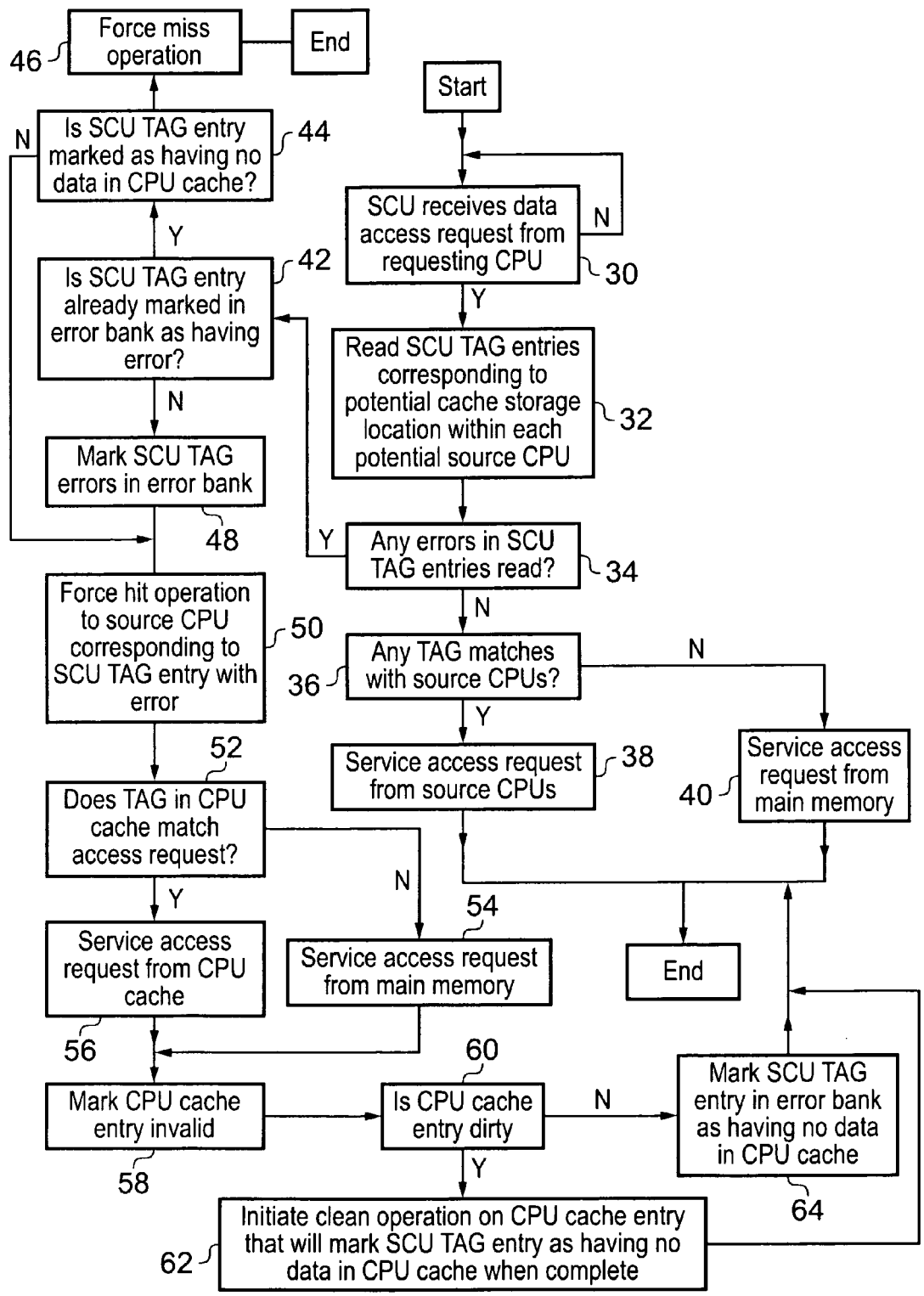
FIG. 4 is a flow diagram schematically illustrating the operation of the system of FIG. 1 in handling errors within entries of the TAG memory of the snoop control unit.

FIG. 4 is a flow diagram schematically illustrating the handling of errors within a TAG memory entry of the snoop control unit 22. At step 30 the snoop control unit 20 receives a data access request from a requesting processor core. At step 32 the snoop control unit 20 reads the TAG entries within the TAG memory 22 which correspond to potential cache storage locations within each potential source processor (i.e. a processor which may be storing within its local data cache 12, 14, 16, 18) a copy of the data value to be accessed by the data access request received at step 30.

At step 34 a determination is made as to whether or not there are any errors within the TAG values read at step 32. This error detection can be performed using the error detection data 26 associated with each TAG memory entry.

If no error is detected, then processing proceeds to step 36 where a determination is made as to whether any of the TAG memory entries matches the address associated with the data access request received at step 30. If there are no matches, then the access request is serviced from main memory 22 at step 44. If there is a match, then the access request is serviced from the correct one of the source data caches 12, 14, 16, 18 at step 38. This behaviour will be familiar to those within the technical field as normal for snoop control units serving as coherency control circuitry.

If the determination at step 34 was that an error is detected within one of the TAG memory entries of the snoop control unit, then processing proceeds to step 42. Step 42 determines from the error bank 28 whether or not the TAG memory entry concerned has already been marked as having an error within the error bank 28. If an error has already been noted for that TAG memory entry, then step 44 serves to determine whether or not the entries marked as having no dirty data still stored within the dirty cache. If the data cache line is clean, then processing proceeds to step 46 where a miss operation is formed.

If at step 42 the TAG memory entry within which an error is detected is not one which is already marked within the error bank 28 as containing an error, then step 48 marks the error bank 28 to note the error. Following the marking at step 48, or if the determination at step 44 is that a marked error corresponds to a storage location within the data cache which has not been confirmed as clean, then processing proceeds to step 50 where a hit operation is forced to the storage location within the data cache 12, 14, 16, 18 which corresponds to that TAG memory entry within the TAG memory 22 of the snoop control unit 20.

Step 52 uses the TAG entry within the data cache 12, 14, 16, 18 as illustrated in FIG. 2 to confirm whether or not the storage location within the data cache 12, 14, 16, 18 is storing the data value to which an access is being made. If the comparison at step 52 does not match, then step 54 services the access request from main memory in a similar manner to that which was performed at step 40. If the comparison at step 52 confirms a match, then step 56 services the access request from the storage location within the data cache 12, 14, 16, 18.

Step 58 marks the storage location within the data cache 12, 14, 16, 18 corresponding to the TAG memory entry within the TAG memory 42 where an error has been detected as being invalid irrespective of whether or not it actually matches the access request concerned. Step 60 determines whether the storage location within the data cache is dirty and if necessary step 62 initiates a clean operation of that cache entry that will mark the error bank 28 as indicating that the error is confirmed as not associated with any dirty data when the clean operation has been confirmed. If the determination at step 60 is that the cache line is not dirty, then step 64 marks the error as not associated with dirty data without a clean operation being necessary.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a plurality processing circuits, each of said circuits including a cache memory configured to store data values from a main memory; and
coherency control circuitry coupled to said plurality of processing circuits and configured to control coherency of data values stored within said plurality of processing circuits; wherein
said coherency control circuitry includes:
(i) a TAG memory storing address values indicative of memory addresses within said main memory of data values stored within said plurality of processing circuits; and
(ii) error detection circuitry coupled to said TAG memory, said error detection circuitry configured to detect an error within an entry of said TAG memory corresponding to a storage location within a cache memory of a processing circuit of said plurality of processing circuits and upon detection of said error to force a hit operation within said storage location, wherein said error detection circuitry is triggered by an access request to a target memory address received from one of said plurality of processing circuits to read said entry within said TAG memory and to detect said error, wherein said access request triggers reading of a plurality of entries within said TAG memory, each of said plurality of entries corresponding to a candidate storage location for data corresponding to said target memory address within a respective cache memory of said plurality of processing circuits.

2. Apparatus as claimed in claim 1, wherein upon said detection of said error said error detection circuitry triggers marking said storage location within said cache memory as invalid.

3. Apparatus as claimed in claim 1, wherein hit operation triggers a comparison comparing said target memory address with address data stored within said cache memory indicating one or more memory addresses associated with said storage location.

4. Apparatus as claimed in claim 3, wherein if a result of said comparison is a match between said target memory address and said address data stored within said cache memory indicating one or more memory addresses associated with said storage location, then said access request is serviced by said storage location.

5. Apparatus as claimed in claim 1, wherein if said data stored within said storage location is marked as dirty indicating that said data has been written within said storage location after being copied to said storage location from said main memory, then said cache memory performs a clean operation whereby said data is copied back to said main memory using address data stored within said cache memory indicating one or more memory addresses associated with said storage location.

6. Apparatus as claimed in claim 1, wherein said detection is performed for each of said plurality of entries within said TAG memory.

7. Apparatus as claimed in claim 6, wherein said actions responsive to detection of an error are performed in respect of each storage location within a respective cache memory for which an error is detected.

8. Apparatus as claimed in claim 1, wherein said plurality of processing circuits comprise a plurality of processor cores each executing a respective stream of program instructions and each having an associated data cache memory.

9. Apparatus as claimed in claim 8, wherein said coherency control circuitry is a snoop control unit controlling coherency between said data cache memories associated with respective processor cores.

10. Apparatus as claimed in claim 1, wherein said coherency control circuitry includes an error bank storing data identifying in which entries of said TAG memory an error has been detected.

11. Apparatus as claimed in claim 10, wherein
said error detection circuitry is triggered by an access request to a target memory address received from one of said plurality of processing circuits to read said entry within said TAG memory and to detect said error;
upon said detection of said error said error detection circuitry triggers marking said storage location within said cache memory as invalid;
if said data stored within said storage location is marked as dirty indicating that said data has been written within said storage location after being copied to said storage location from said main memory, then said data is subject to a clean operation whereby said data is copied back to said main memory using address data stored within said cache memory indicating one or more memory addresses associated with said storage location; and
upon subsequent access requests to said target address said hit operation is forced until said storage location is marked as invalid and, additionally, if said storage location is marked as dirty, said data has been copied back to said main memory.

12. Apparatus as claimed in claim 11, wherein after said storage location is marked as invalid and, if said storage location is marked as dirty, said data has been copied back to said main memory, further access requests to said target address are forced to miss within said TAG entry marked within said error bank.

13. Apparatus as claimed in claim 12, wherein said TAG entry is unmarked within said error bank following a test operation indicating said TAG entry does not have a hardware error.

14. Apparatus as claimed in claim 13, wherein said test operation is a software controlled software test operation.

15. Apparatus for processing data comprising:
a plurality of processing means for processing data, each processing means including a cache means for storing data values from main memory means for storing data values; and
coherency control means, coupled to said plurality of processing means, for controlling coherency of data values stored within said plurality of processing means; wherein
said coherency control means includes:
(i) TAG memory means for storing address values indicative of memory addresses within said main memory means of data values stored within said plurality of processing means; and
(ii) error detection means, coupled to said TAG memory means, for detecting an error within an entry of said TAG memory means corresponding to a storage location within a cache memory means of a processing means of said plurality of processing means and upon detection of said error to force a hit operation within said storage location, wherein said error detection means is triggered by an access request to a target memory address received from one of said plurality of processing means to read said entry within said TAG memory means and to detect said error, wherein said access request triggers reading of a plurality of entries within said TAG memory means, each of said plurality of entries corresponding to a candidate storage location for data corresponding to said target memory means address within a respective cache memory of said plurality of processing means.

16. A method of responding to errors within an apparatus for processing data comprising:

a plurality processing circuits, each of said circuits including a cache memory configured to store data values from a main memory; and coherency control circuitry coupled to said plurality of circuits and configured to control coherency of data values stored within said plurality of processing circuits; wherein said coherency control circuitry includes:

(i) a TAG memory storing address values indicative of memory addresses within said main memory of data values stored within said plurality of processing circuits; and (ii) error detection circuitry coupled to said TAG memory; said method comprising the steps of:

detecting an error within an entry of said TAG memory corresponding to a storage location within a cache memory of a processing circuit of said plurality of processing circuits; and upon detection of said error, forcing a hit operation within said storage location, wherein said error detection circuitry is triggered by an access request to a target memory address received from one of said plurality of processing circuits to read said entry within said TAG memory and to detect said error, wherein said access request triggers reading of a plurality of entries within said TAG memory, each of said plurality of entries corresponding to a candidate storage location for data corresponding to said target memory address within a respective cache memory of said plurality of processing circuits.

* * * * *